Patented May 27, 1930

1,763,797

UNITED STATES PATENT OFFICE

KARL THIESS, THEODOR MEISSNER, AND CARL JOSEF MÜLLER, OF HOCHST-ON-THE-MAIN, GERMANY, ASSIGNORS TO GENERAL ANILINE WORKS, INC., OF NEW YORK, N. Y., A CORPORATION OF DELAWARE

INDIGOID VAT DYESTUFFS

No Drawing. Application filed December 17, 1927, Serial No. 240,922, and in Germany December 24, 1926.

The present invention relates to indigoid vat dyestuffs dyeing violet tints.

It is already known that by condensing isatin-α-anilide with 3-hydroxy-1-thionaphthene a vat dyestuff of the indigo type, dyeing violet tints, is obtained. This dyestuff is, however, of no use for practical purposes, because dyestuffs of real value can only be produced by introducing a substituent into the hydroxythionaphthene and of a halogen into the isatin component and particularly valuable dyestuffs only by introducing a halogen into the 5- and 7-position of the isatin component. (Compare for instance the dyestuffs obtainable by the process described and claimed in U. S. Patent No. 1,590,685.)

We have now found that dyestuffs can be prepared which are in every respect equal to the violet-dyeing condensation products from substituted hydroxythionaphthenes and 5.7-dihalogen-isatin-α-chlorides and, as regards purity of tone and fastness, are even partly superior to them, by using such 7-methylisatin-α-compounds as contain a halogen or the methyl group in 5-position, and hydrogen, or a halogen or methyl in 4-position. These isatin-α-compounds may be represented by the following graphical formula:

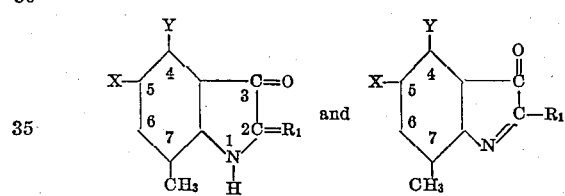

respectively wherein X stands for halogen or $CH_3$; Y for hydrogen, a halogen, or $CH_3$ and $R_1$ for a halogen or an arylimide, whereas to the new dyestuffs obtainable therefrom the following formula may be attributed:

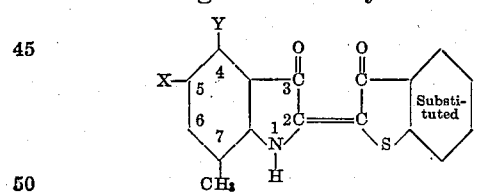

wherein X stands for halogen or a methyl group and Y stands for hydrogen, halogen or a methyl group.

The following examples serve to illustrate our invention, but they are not intended to limit it thereto, the parts being parts by weight:

1. 18,5 parts of 5-chlor-3-hydroxy-1-thionaphthene are dissolved while heating in 200 parts of chlorobenzene. 19,6 parts of 5-chlor-7-methylisatin are then converted into the corresponding isatin-α-chloride by heating with 22 parts of phosphorus pentachloride in 200 parts of chlorobenzene. After the two solutions have been united, the 5-chlor(2) thionaphthene-5'-chlor-7'-methyl(2)indol-indigo is precipitated immediately in crystalline form. After having heated the mass for a short time to 80°–90° C. in order to complete the formation of the dyestuff, the dyestuff thus obtained is filtered by suction and washed with alcohol to remove the solvent. The dyestuff, which constitutes the 5-chloro(2)thionaphthene-5'-chlor-7'-methyl(2)indolindigo, dyes the fiber from a yellowish-olive vat violet tints of good fastness to boiling.

The dyestuff is formed out of the components according to the following equation:

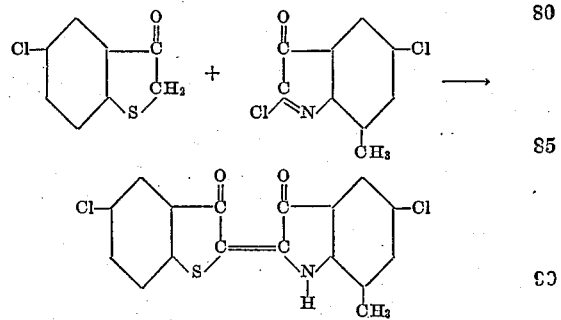

2. 19,85 parts of 7-methyl-5-chlor-1-hydroxythionaphthene are dissolved in 200 parts of water and 12 parts of caustic soda solution of 40° Bé. while gently heating; after subduing the alkaline reaction by means of sulfuric acid, a suspension of 31,9 parts of 5-chlor-7-methylisatin-4'-chlor-o-toluidide in 150 parts of water is slowly run into this mixture at 50° C. and the mixture is then heated at 60-70° C. until there can no longer be detected any hydroxythionaphthene. After having added to the mass about 10 parts of caustic soda solution of 40° Bé. the whole is filtered while hot, washed until neutral and dried. The 5-chlor-7-methyl-2-thionaphthene-5'-chlor-7'-methyl-2-indolindigo thus obtained forms a dark-violet powder dyeing cotton from a yellow vat very clear and fast bluish-violet tints. The dyeings obtainable thereby are purer than those obtainable by the dyestuff prepared from 5.7-dihalogenisatin-α-chloride.

3. 25,35 parts of 5.6.7-trichlorhydroxythionaphthene are treated in a ball mill with 31,9 parts of 5-chlor-7-methylisatin-4'-chloro-toluidide and 100 parts of water and the mass is then heated to boiling with 400 parts of water while stirring. At the same time steam is passed through the mass until no further quantity of 5-chlor-o-toluidine runs over. The reaction product is rendered alkaline by adding about 10 parts of caustic soda solution, filtered while hot and washed until neutral. The dyestuff when dry forms a violet powder which dyes from a light-yellow vat cotton very bright violet tints.

4. 23,3 parts of 4-methyl-5.7-dichlorhydroxythionaphthene are dissolved in 100 parts of water and 12 parts of caustic soda solution of 40° Bé. while gently heating. The solution is rendered neutral by means of sulfuric acid with an addition of ice, and made up to 250 parts.

31,9 parts of 5-chlor-7-methylisatin-4'-chlor-o-toluidide, after being made into a paste by adding 150 parts of water, are introduced at 50-60° C. into this suspension and the whole is stirred at 60-70° C. until the reaction upon the hydroxythionaphthene has ceased. The mass is then made alkaline with sodium carbonate, filtered while hot and washed until neutral. The 4-methyl-5.7-dichlor-2-thionaphthene-5'-chlor-7'-methyl-2-indolindigo forms, when dry, a dark violet powder which dyes the cotton fiber from a golden-yellow vat bright violet-blue tints of good fastness.

5. If the 7-methyl-5-chlorhydroxythionaphthene, as used in Example 2, is replaced by an equal quantity of 4-methyl-6-chlor-hydroxythionaphthene, a dyestuff is obtained which dyes cotton violet tints of a somewhat redder hue.

6. If the quantity of 5.6.7-trichlorhydroxythionaphthene, as used in Example 3, is replaced by 21, 25 parts of 4.7-dimethyl-5-chlorhydroxythionaphthene, a dyestuff is obtained which gives on the fiber somewhat bluer tints than the dyestuff obtainable according to Example 2 and which, as regards purity of tone, is superior to the dyestuff prepared from 5.7-dichlorisatin-α-chloride.

7. 31,9 parts of 5-chlor-7-methylisatin-4'-chlor-o-toluidide are heated for some hours to boiling together with 23,3 parts of 4-methyl-5.7-dichlor-3-hydroxy-1-thionaphthene, to which 3 parts of sodium carbonate have been added, in 500 parts by volume of alcohol. The dyestuff which separates is filtered off and dried. It is identical with the dyestuff obtainable according to Example 4.

8. 19,85 parts of 4-methyl-6-chlorhydroxythionaphthene are dissolved in 200 parts of water and 12 parts of caustic soda solution of 40° Bé. while adding a wetting agent and gently heating. The alkaline reaction is the subdued by means of dilute sulfuric acid and there is then gradually added at 50-60° C. a suspension of 34,7 parts of 5-chlor-4.7-dimethylisatin-4-chlor-p-xylidide in 200 parts of water. The mass is then heated to 65-75° C. until there can no longer be detected any hydroxythionaphthene. After having added thereto about 10 parts of caustic soda solution of 40° Bé., the whole is filtered while hot, washed with hot water until neutral and dried. The so obtained 4-methyl-6-chlor(2)thionaphthene-4'.7'-dimethyl-5'-chlor-(2)-indolindigo is a violet powder which dyes cotton from an olive vat clear, red and fast reddish-violet tints.

9. If for the 4-methyl-6-chlorhydroxythionaphthene as used in Example 8 are substituted 19,85 parts of 7-methyl-5-chlorhydroxythionaphthene and the reaction product is treated further as indicated in the said example, a dyestuff is obtained which dyes from an olive vat cotton clear violet tints which are considerably bluer than the dyeings obtainable by the dyestuff prepared according to Example 8.

10. 23,3 parts of 4-methyl-5.7-dichlorhydroxythionaphthene are treated in a ball mill with 34,7 parts of 5-chlor-4.7-dimethylisatin-4'-chlor-p-xylidide and 200 parts of water and then heated to boiling with 400 parts of water while stirring. At the same time water vapour is passed through the mass until no more chlor-p-xylidine runs over. The reaction mass is made alkaline by adding about 10 parts of caustic soda solution of 40° Bé., then filtered while hot and washed until neutral. The dyestuff forms in a dry state a violet powder which dyes cotton from a yellow vat fast and very pure violet tints.

11. 21,25 parts of 4.7-dimethyl-5-chlor-hydroxythionaphthene are thoroughly ground in a ball mill with 27,8 parts of 5.7-dimethyl-isatin-m-xylidide and three times the quantity of water. To the mixture are added ten times the quantity of water whereupon it is heated to boiling by passing water vapour through it until no more m-xylidine can be detected in the distillate. The resulting dyestuff is filtered while hot, washed with hot water and dried. It forms a bluish-violet powder which dyes the cotton fiber from a yellow vat fast pure violet tints.

12. If for the 5.7-dimethylisatin-m-xylidide as used in Example 11 are substituted 30,6 parts of 4.5.7-trimethylisatin-ψ-cumidide, a dyestuff is obtained which dyes cotton somewhat bluer tints than the dyestuff obtainable according to Example 11.

13. If for the 5.7-dimethylisatin-m-xlidide as used in Example 11 are substituted 39,2 parts of 4.5-dichlor-7-methylisatin-4'.5'-dichlor-o-toluidide a bluish-violet dyestuff is produced which dyes the cotton fiber from a golden-yellow vat very pure bluish-violet tint.

14. 34,7 parts of 5-chlor-4.7-dimethylisatin-4'chlor-p-xylidide are introduced together with 19,9 parts of 4-methyl-6-chlor-3-hydroxy-1-thionaphthene into 500 parts of acetic anhydride and the resulting solution is heated for some hours to boiling. After cooling, the solution is filtered by suction and the dyestuff so obtained is washed with alcohol and dried. It is identical with the dyestuff produced according to Example 8.

15. 19,9 parts of 5-chlor-7-methyl-3-hydroxy-1-thionaphthene are dissolved in 150 parts of chlorobenzene while heating. There are then heated with 22 parts of phosphorous pentachloride in 200 parts of chlorobenzene 21 parts of 4.7-dimethyl-5-chlorisatin and the latter thus transformed into the corresponding isatin-α-chloride. On uniting the two solutions, the 5-chlor-7-methyl-(2)thionaphthene-4'.7'-dimethyl-5'-chlor (2) indolindigo is precipitated immediately in a crystalline form. In order to complete the formation of the dyestuff, the mass is heated for a short time to 80–90° C. whereupon the dyestuff is filtered by suction while cold and washed with alcohol to remove the chlorobenzene. The 7-methyl-5-chlor (2) thionaphthene-5'-chlor-4'.7'-dimethyl (2)-indolindigo dyes the fiber from an olive-green vat clear violet tints of good fastness to boiling and an excellent fastness to light. It is identical with the dyestuff obtainable according to Example 9.

16. If for the 5-chlor-7-methyl-3-hydroxy-1-thionaphthene as used in Example 15 are substituted 19,9 parts of 4-methyl-6-chlor-3-hydroxy-1-thionaphthene and the same procedure followed as that set forth in the said example, the 4-methyl-6-chlor-2-thionaphthene-4'.7'-dimethyl-5'-chlor-2-indolindigo is obtained which dyes the fiber from an olive vat bright reddish-violet tints of very good fastness to boiling and to washing. It is identical with the dyestuff obtainable according to Example 8.

17. 23 parts of 4.7-dimethyl-5-chlorisatin-α-chloride dissolved in 200 parts of chlorobenzene, are united at 60 to 70° C. with a solution of 25,3 parts of 5.6,7-trichlor-3-hydroxy-1-thionaphthene. The new dyestuff thus produced separates at once. It is filtered and washed free from chlorobenzene with alcohol. The resulting 5.6.7-trichlor(2)thionaphthene-4'.7'-dimethyl-5'-chlor (2) indolindigo dyes the fiber from a golden-yellow vat intense violet-blue tints of good fastness to washing.

18. 23,3 parts of 4-methyl-5.7-dichlor-3-hydroxy-1-thionaphthene are dissolved while heating in 200 parts of dry chlorobenzene. 19,6 parts of the 5-chlor-7-methylisatin are heated to the boiling point of the solvent with 22 parts of phosphorus pentachloride in 200 parts of dry chlorobenzene and thus transformed into the 5-chlor-7-methylisatin-α-chloride. When the two solutions have somewhat cooled down, they are united whereupon the dyestuff is immediately precipitated as crystals. The formation of the dyestuff is completed by heating the product at 80 to 90° C. After the solution has cooled the dyestuff is filtered by suction and freed from the adhering solvent by washing it with alcohol or subjecting it to distillation with water-vapour. The resulting 4-methyl-5.7-dichlor-2-thionaphthene-5'-chlor-7'-methyl-2-indolindigo dyes the cotton fiber from a golden-yellow vat bright violet tints of good fastness to light. It is identical with the dyestuff obtainable according to Example 4.

19. If for the 5-chlor-7-methyl-isatin as used in Example 18 are substituted 17,5 parts of 5.7-dimethylisatin and the procedure is followed as set forth in the said example, 4-methyl-5.7-dichlor-2-thionaphthene-5'.7'-dimethyl-2-indolindigo is obtained which dyes the fiber from a yellow vat violet tints of good fastness to light.

20. 19,6 parts of 5-chlor-7-methylisatin are suspended in 200 parts of chlorobenzene and this suspension is transformed into the corresponding isatin-α-chloride by heating with 22 parts of phosphorus pentachloride. The solution so obtained is mixed at 60° C. with a solution of 21,2 parts of 4.7-dimethyl-5-chlor-3-hydroxy-1-thionaphthene. After the whole has been heated for a short time, the condensation process is complete. The 4.7-dimethyl-5-chlor(2)thionaphthene-5'-chlor-7'-methyl(2)indolindigo is then freed from the chlorobenzene by filtration and dried. It dyes the fiber very clear, violet tints of good fastness to washing and boiling. It is identical with the dyestuff obtainable according to Example 6.

We claim:

1. As new products, vat dyestuffs of the following formula:

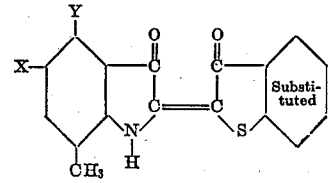

wherein X stands for halogen or $CH_3$, and Y stands for hydrogen, halogen or $CH_3$ being, when dry, violet powders forming with alkalinehydrosulfite yellow to green vats from which the fiber is dyed reddish to bluish-violet tints of good fastness.

2. As new products, vat dyestuffs of the following formula:

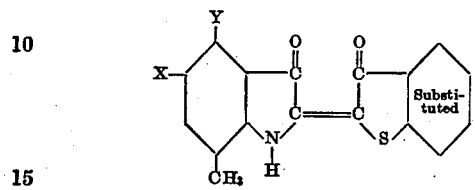

wherein X stands for halogen, and Y stands for hydrogen or $CH_3$ being, when dry, violet powders forming with alkaline hydrosulfite yellow to green vats from which the fiber is dyed reddish to bluish-violet tints of good fastness.

3. As new products, vat dyestuffs of the following formula:

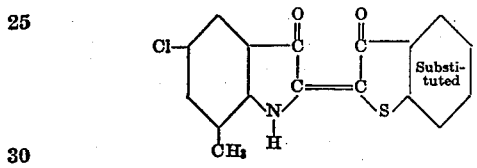

being, when dry, violet powders forming with alkaline hydrosulfite yellow to green vats from which the fiber is dyed redish to bluish-violet tints of good fastness.

4. As new products, vat dyestuffs of the following formula:

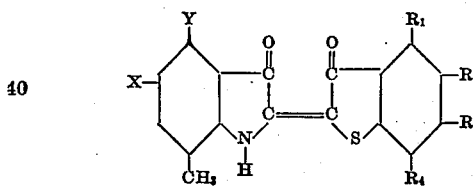

wherein X stands for halogen or $CH_3$, Y stands for hydrogen, halogen or $CH_3$, $R_1$ stands for hydrogen or $CH_3$, $R_2$ stands for hydrogen or halogen, $R_3$ stands for hydrogen or halogen, and $R_4$ stands for hydrogen, halogen or $CH_3$ being, when dry, violet powders forming with alkaline hydrosulfite yellow to green vats from which the fiber is dyed reddish to bluish-violet tints of good fastness.

5. As new products, vat dyestuffs of the following formula:

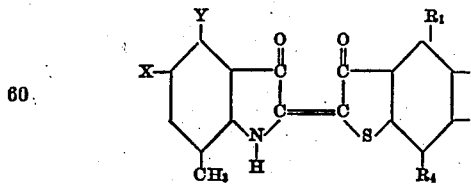

wherein X stands for halogen, Y stands for hydrogen or $CH_3$, $R_1$ stands for hydrogen or $CH_3$, $R_2$ stands for hydrogen or halogen, $R_3$ stands for hydrogen or halogen, and $R_4$ stands for hydrogen, halogen or $CH_3$ being, when dry, violet powders forming with alkaline hydrosulfite yellow to green vats from which the fiber is dyed reddish to bluish-violet tints of good fastness.

6. As new products, vat dyestuffs of the following formula:

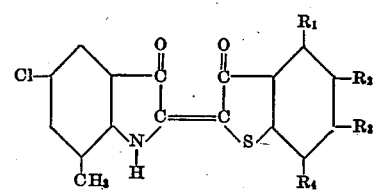

wherein $R_1$ stands for hydrogen or $CH_3$, $R_2$ stands for hydrogen or halogen, $R_3$ stands for hydrogen or halogen, and $R_4$ stands for hydrogen, halogen or $CH_3$ being, when dry, violet powders forming with alkaline hydrosulfite yellow to green vats from which the fiber is dyed reddish to bluish-violet tints of good fastness.

7. As new products, vat dyestuffs of the following formula:

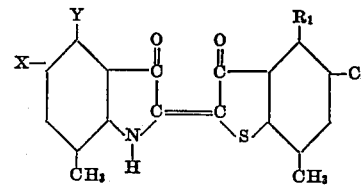

wherein X stands for halogen or $CH_3$, Y stands for hydrogen, halogen or $CH_3$, and $R_1$ stands for hydrogen or $CH_3$ being, when dry, violet powders forming with alkaline hydrosulfite yellow to green vats from which the fiber is dyed reddish to bluish-violet tints of good fastness.

8. As new products, vat dyestuffs of the following formula:

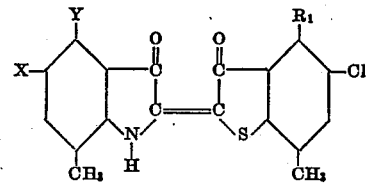

wherein X stands for halogen, Y stands for hydrogen or $CH_3$, and $R_1$ stands for hydrogen or $CH_3$.

9. As new products, vat dyestuffs of the following formula:

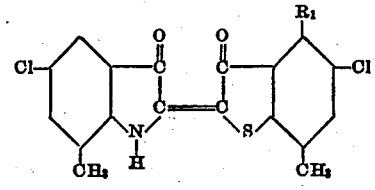

wherein $R_1$ stands for hydrogen or $CH_3$, being, when dry, violet powders forming with alkaline hydrosulfite yellow to green vats from which the fiber is dyed reddish to bluish-violet tints of good fastness.

10. As new products, vat dyestuffs of the following formula:

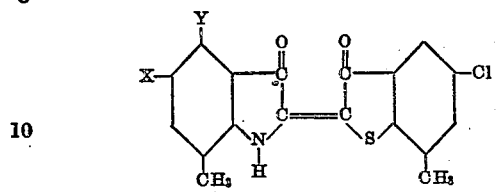

wherein X stands for halogen or $CH_3$, and Y stands for hydrogen, halogen or $CH_3$ being, when dry, violet powders forming with alkaline hydrosulfite yellow to green vats from which the fiber is dyed reddish to bluish-violet tints of good fastness.

11. As new products, vat dyestuffs of the following formula:

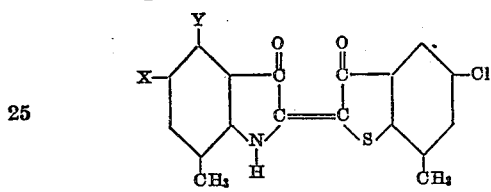

wherein X stands for halogen, and Y stands for hydrogen or $CH_3$ being, when dry, violet powders forming with alkaline hydrosulfite yellow to green vats from which the fiber is dyed reddish to bluish-violet tints of good fastness.

12. As a new product, a vat dyestuff of the following formula:

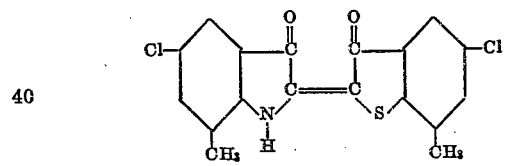

being, when dry, a dark violet powder forming with alkaline hydrosulfite a yellow vat from which cotton is dyed very clear and fast bluish-violet tints.

In testimony whereof, we affix our signatures.

KARL THIESS.
THEODOR MEISSNER.
CARL JOSEF MÜLLER.

CERTIFICATE OF CORRECTION.

Patent No. 1,760,797.  Granted May 27, 1930, to

KARL THIESS ET AL.

It is hereby certified that error appears in the printed specification of the above numbered patent requiring correction as follows: Page 4, line 33, for the misspelled word "redish" read "reddish"; same page, line 119, end of claim 8, insert "being, when dry, violet powders forming with alkaline hydrosulfite yellow to green vats from which the fiber is dyed reddish to bluish-violet tints of good fastness"; and that the said Certificate should be read with these corrections therein that the same may conform to the record of the case in the Patent Office.

Signed and sealed this 5th day of August, A. D. 1930.

(Seal)

Wm. A. Kinnan,
Acting Commissioner of Patents.